Nov. 23, 1937.    A. JOHNSON    2,099,959
HAND AND AIR LOW PRESSURE GREASE GUN
Filed April 21, 1934
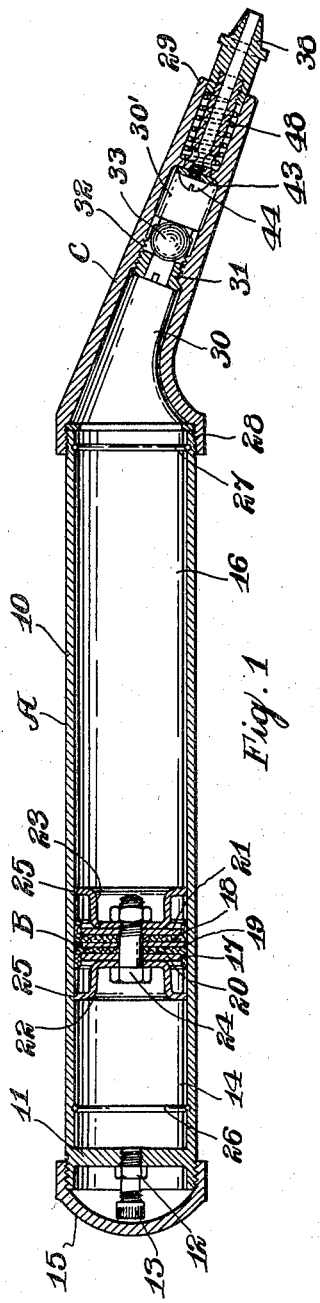
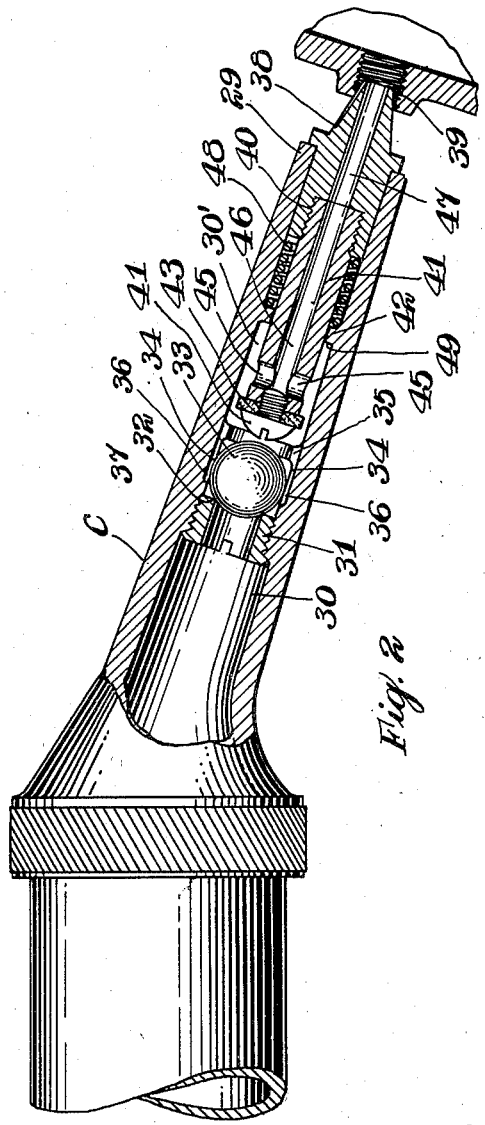
Inventor
August Johnson
By Howard Fisher
Attorney Patented Nov. 23, 1937

2,099,959

UNITED STATES PATENT OFFICE 2,099,959

HAND AND AIR LOW PRESSURE GREASE GUN

August Johnson, Fargo, N. Dak., assignor to Jiffy Lubricator Company, Inc., Fargo, N. Dak., a corporation of North Dakota Application April 21, 1934, Serial No. 721,806

9 Claims. (Cl. 221—47.4)

This invention relates to a low air pressure hand grease gun of unitary nature so that it can be easily handled and carried from place to place for greasing purposes.

A feature resides in a low pressure grease gun which is self-contained and which is adapted to carry a volume of air in one end and grease in the other end. This gun is of a simple nature and is constructed so that the operator may readily apply it to a bearing which is to be greased. The application of the nozzle end to the bearing to be greased automatically releases the nozzle so that the air in the reservoir chamber of the gun will force the grease into the bearing under low pressure.

It is also a feature to provide a discharge nozzle which automatically closes when the gun is not in use and opens when in use. The nozzle is provided with a check valve means which holds the grease against back pressure in the discharge nozzle and permits the operator to exert any additional force that is desirable in injecting the grease into the bearing from the nozzle by bearing against the rear of the gun. The nozzle is slidable so that its inner end may act as a plunger in ejecting the grease in the discharge end of the nozzle proper. The nozzle is of a simple construction and is formed so that the operating parts thereof may be disassembled or replaced at any time.

My low pressure grease gun is provided with a floating piston assembly wherein a double acting piston is provided, one side of which takes the air pressure, the other side of which acts against the grease in the lubricant compartment. This floating piston assembly includes a pair of bearing members which guide the floating piston assembly in the cylinder of the gun. Thus I provide a piston assembly which is free to operate and will not jam but flow freely in the gun cylinder. This is important in the free operation of my grease gun.

The cylinder is provided with retainer ring means which limit the movement of the piston in the cylinder and act as stops. The rear end of my low pressure grease gun is formed with a removable cap under which an air valve is provided and the valve is formed with an air release cap so that the air chamber may be relieved when it is desired to fill grease into the cylinder of the gun, thus making a unitary air valve and release which is simple to operate.

In the drawing I have illustrated my low air pressure hand grease gun, and:

Figure 1 is a longitudinal section of my low air pressure hand grease gun in its assembly.

Figure 2 is an enlarged section detail of the nozzle and a portion of the gun cylinder.

My low air pressure hand grease gun A is provided with a tubular cylinder 10 which is closed at one end by the wall 11. An air valve 12 is mounted in the wall 11 and is provided with an air release cap 13. The cap 13 is constructed so as to release the air from the air chamber 14 when the cap 13 is in one position, and to close the valve 12 when in another position. The valve 12 is provided with an automatic closing valve within the same of ordinarily well known construction. The gun A is provided with a closure cap 15 which incloses the valve 12 and provides a bearing for the operator's hand in using the grease gun A. The gun A is designed to be operated by hand and carries air pressure in the chamber 14. A gun of this character is termed a low pressure greasing device and it is adapted to be used without any air hose connecting the same so that the gun is of a unitary self-contained nature with the desired pressure of air carried in the chamber 14 which is adapted to press against the grease in the chamber 16.

I provide a floating piston assembly B which includes oppositely disposed leather cups 17 and 18 between which a washer bearing 19 is mounted. The cups 17 and 18 are held assembled together by the washers 20 and 21 which fit inside of the leather cups 17 and 18 and are held in place by the bearing cup-shaped flanged washers 22 and 23 and the bolt 24 which extends through the same. The floating piston assembly B operates in the cylinder 10. It is desirable that the piston assembly B float freely in the cylinder 10 and yet it must be of a simple structure designed so that it will not get out of order and to insure its free operation at all times. I accomplish this by means of the cup-shaped flanged washers 22 and 23 which are clamped in place by the bolt 24 and which have bearing flange rings 25 which freely engage the inner wall of the cylinder 10 so as to act as guides on either side of the floating piston assembly B. Thus the floating piston B cannot cock to one side or get out of line in operation, but is guided to slide freely by the influence of the air in the chamber 14 to force the grease out of the chamber 16. The movement of the piston in the cylinder 10 is regulated by the spring stop rings 26 and 27 which are positioned adjacent the respective ends of the cylinder 10. The ring 26 is spaced sufficiently from the wall 11 so that the grease chamber 16 cannot be filled with too much grease to prevent the placing of a sufficient air cushion in the chamber 14.

I provide a removable unitary nozzle C which is threaded at 28 to the cylinder 10 so that the nozzle C may be removed when it is desired to fill grease into the chamber 16. The nozzle is tapered in formation from the threaded attachment at 28 to the outer end 29 to provide a tapering opening 30 within the same. The nozzle C is formed within the tapered passageway 30 with an increased wall in which the collar 31 is threaded so that it may be removed. The edge of the collar forms a valve seat 32 for the ball check valve 33. The ball valve 33 is adapted to be guided on longitudinally extending ribs 34 which hold the ball freely slidable toward and away from the seat 32. An annular shoulder 35 limits the forward movement of the ball 33 on the ribs 34. Thus the ribs provide a means of centrally guiding the ball in the nozzle C. Slots 36 between the ribs 34 and extending through the annular ring shoulder 35 permit the grease to pass through the passageway 30 of the nozzle and through the opening 37 in the collar 31, past the ball 33 and through the slots 36 into the front chamber 30' of the nozzle. The nozzle assembly C is provided with a slidable pressure release tip 38 which has a tapered discharge end adapted to fit into the opening or fitting which is to be greased when the gun A is in operation to inject grease into a bearing. The tip 38 is threaded at 40 to the hollow plunger 41 which is guided by the collar 42 formed in the wall of the nozzle C. The inner end of the plunger 41 is provided with a leather washer valve 43 held in the end of the plunger by the screw 44 so that the washer may be replaced when it is desired. Holes 45 connect the chamber 30' with the inner passage 46 extending through the plunger 41 and connecting with the passage 47 through the tip 38. A coil spring 48 normally holds the plunger in position with the valve 43 against the shoulder 49 of the collar 42 to close the nozzle C when the tip 38 is in the position illustrated in Figure 1.

In operation the grease gun A is filled with grease in the chamber 16 and by means of the valve 13 the chamber 14 is filled with compressed air which forces the floating piston assembly B against the grease in the chamber 16. This packs the grease into the nozzle C, opening the check valve 33 and filling the chamber 30' with grease. The pressure of the grease against the washer valve 43 and the head of the screw 44 assists in keeping the plunger 41 in closed position as illustrated in Figure 1. When the gun A is filled in this manner it is a complete assembled unit and can be carried from place to place by the operator. The constant pressure on the grease in the chamber 16 eliminates all trouble from air pockets and no air hose is necessary connected with the gun A. Thus the operator may use this low air pressure hand grease gun in a very efficient manner for lubricating wheel bearings of an automobile, universal joints, water pumps, steering gear housings, etc., with an ease that is not obtainable with other types of grease guns. Further, the gun A may be used without danger of over-greasing parts or damaging other parts where too much pressure is undesirable.

The operation of the gun is simple and effective. After the gun is loaded with grease and air the operator simply presses the tip of the nozzle 38 into the opening such as 39, which is to be greased, the pressure of inserting the tip 38 into the opening 39 sliding the plunger 41 into open position as illustrated in Figure 2, whereupon, the pressure against the grease in the chamber 16 forces the grease by the check valve 33 around the valve 43 through the openings 45, 46 and 47 and into the opening 39. The moment the slight pressure, which is necessary to hold the gun A to the opening 39, is released, the plunger 41 automatically closes aided by the spring and the pressure back of the valve 43, whereupon the grease instantly is shut off from being discharged out of the tip 38. The pressure in the chamber 14 is sufficient to eject the grease from the chamber 16.

The ball check 33 prevents any back pressure and also acts as a check valve to maintain the grease in the chamber 30' while the plunger 41 is pushed toward the valve 33, causing grease in the chamber 30' to be ejected out of the passageways 46 and 47 and out of the tip 38. With this operation the operator may increase the pressure of ejecting grease from the nozzle tip should the occasion arise. With the ball check 33 in the nozzle C the operation of the ejecting plunger 41 provides a means of instantly setting up a pressure in the chamber 30' by the sliding of the plunger 41 into open position which tends to close the valve 33 against the pressure from the chamber 14, thus momentarily counteracting the pressure from the chamber 14 in the pushing of the tip 38 into lubricating position.

The angular position of the nozzle C in relation to the cylindrical body and handle portion 10 of the gun A is of importance in permitting the operator to more easily place the tip 38 to the opening to be lubricated. The sleeve of the nozzle C is fixed in this angular position, thus holding the same rigid so that the tip 38 may be operated to open the nozzle C.

The unitary nature of the nozzle C with its tapered formation permits the check valve to be easily removed and the washer 43 readily replaced by removing the screw 44. The check valve nozzle construction is virtually in a one-piece housing, eliminating packing joints and giving a rigid end to the gun. The grease is forced mainly by air pressure beyond the check valve to provide an efficient low pressure grease gun. The combination check valve with the slidable ejecting nozzle construction insures perfect operation in the ejecting of the grease quickly and easily into the opening to be lubricated. The floating piston assembly B is balanced by the bearing flanges projecting from either side of the same, thus permitting the piston to run freely in the cylinder.

In accordance with the patent statutes I have set forth the principles of my grease gun and I desire to have it understood that the invention should be interpreted to the broadest scope of the following claims with such obvious structure as may come within the same.

I claim:

1. A hand air pressure grease gun including an air chamber, a grease chamber, a floating piston assembly between said chambers, a discharge nozzle including a check valve and movable closure plunger valve injecting tip having a valve head including a flexible removable seal thereon to seal said nozzle in one position, and spring means urging said nozzle into closed position.

2. A hand operated air pressure grease gun including, a hollow body, an air chamber in said body for compressed air, a grease chamber in said body, a floating piston separating said chambers, and an angularly disposed nozzle connected to said grease chamber, normally closed by a valve closed by grease pressure, said nozzle including a valve and means for automatically ejecting grease when opened by pressing the nozzle against the bearing to be lubricated.

3. A floating piston assembly for cylinders of grease guns including, a pair of oppositely disposed leather cups, bearing member engageable with the inner surface of the cylinder spaced outwardly from the free edges of each of said cups, and means for holding said assembly together, whereby the same may be floated in a cylinder to operate freely in either direction.

4. A piston assembly for grease guns including, packing means, and bearing means on either side of said packing means engageable with the inner wall of the grease gun to support said piston assembly freely slidable in a floating nature to operate in either direction guided by said bearing means against getting out of operative alignment.

5. A floating piston assembly for grease guns and the like adapted to be operated in either direction including, packing means engageable against a cylinder wall, bearing means on either side of said packing means and spaced therefrom engageable against the cylinder wall, and means for clamping the elements of said piston assembly together.

6. A hand operated grease gun for low pressure greasing including, a cylindrical hollow handle member closed at one end, a floating piston assembly freely slidable in either direction in said handle member, an offset tapered nozzle on the other end of said handle, a check valve in said nozzle, and a slidable release valve plunger ejecting tip having a flexible removable valve head thereon against which grease operates under pressure for normally closing said nozzle and which may be operated for opening the same by pressure on said tip.

7. A grease ejecting nozzle for grease guns comprising, a tapered tube adapted to be fixed to the grease gun, a ball check valve, longitudinal ribs adapted to guide said valve, a removable collar seat for said valve, shoulders co-operating with said ribs to limit the movement of said valve in a direction away from said collar seat, a slidable plunger valve ejecting tip in the apex of said tapered tube, a valve head on said plunger valve, a seat in said tube cooperable with said valve head, and spring means for holding said slidable plunger valve ejecting tip normally in closed position.

8. A grease ejector nozzle for grease guns including, a tapered body portion, a removable check valve, a grease ejecting tubular plunger in the apex of said body portion slidably positioned in said nozzle, a valve shoulder and guide for said plunger, a valve member carried on the end of said plunger, screw means for holding said valve shoulder to said plunger, spring means for normally closing said valve of said plunger against said valve shoulder, and an ejecting tip secured to said plunger.

9. A hand operated air pressure grease gun including, a hollow body, an air chamber for compressed air in said body, a grease chamber in said body, a floating piston separating said chambers, a nozzle on said grease chamber normally closed by grease pressure, said nozzle including a plunger and valve for automatically ejecting grease when opened by pressing the nozzle against the bearing to be lubricated.

AUGUST JOHNSON.